United States Patent [19]
Cailloux

[11] 3,982,417
[45] Sept. 28, 1976

[54] DEVICE FOR CONTROLLING A MOVABLE MEMBER ON A MACHINE TOOL

[75] Inventor: Paul Cailloux, Val de Marne, France

[73] Assignee: Promecan Sisson-Lehamann, Saint-Denis, France

[22] Filed: Dec. 31, 1975

[21] Appl. No.: 645,882

[30] Foreign Application Priority Data
Jan. 20, 1975  France .................. 75.01596

[52] U.S. Cl. .................. 72/453.01; 72/441
[51] Int. Cl.² .................. B21J 9/12; B21J 9/20
[58] Field of Search .............. 72/453, 441, 443, 319

[56] References Cited
UNITED STATES PATENTS

| | | |
|---|---|---|
| 3,350,912 | 11/1967 | Smith, Jr. .................. 72/319 |
| 3,730,313 | 5/1973 | Louenser .................. 72/441 X |
| 3,756,145 | 9/1973 | Amacher .................. 72/453 X |

Primary Examiner—Milton S. Mehr
Attorney, Agent, or Firm—Michael J. Striker

[57] ABSTRACT

This hydraulic system for controlling and driving a movable member in a machine tool, for example the movable apron performing sheet-metal bending or shearing operations, comprises a single distributor incorporating a slide valve responsive either to a push member manually actuated by the operator of the machine or to another push member responsive in turn to a mechanical device actuated by one or a plurality of separate control members associated with said movable member or the like for automatically changing the speed of said movable member and stopping same at the end of its stroke.

12 Claims, 10 Drawing Figures

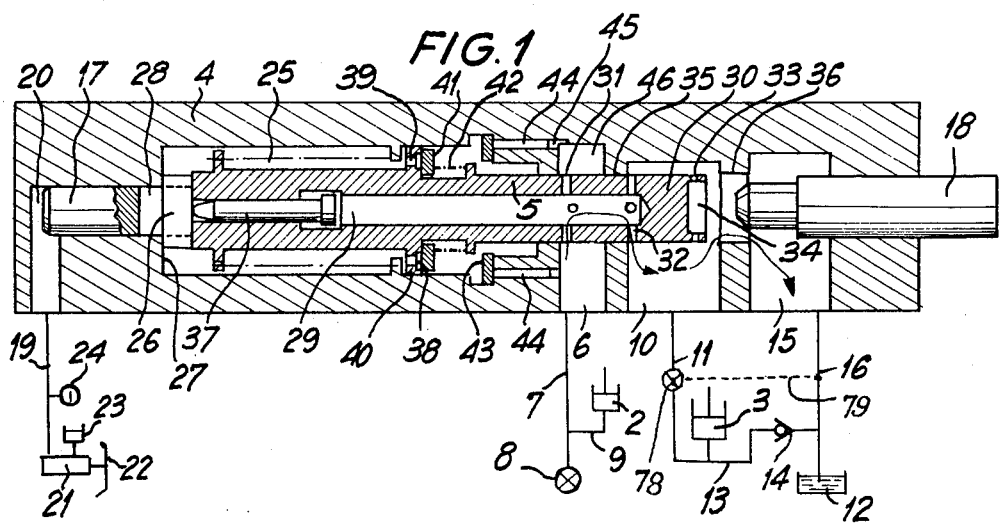
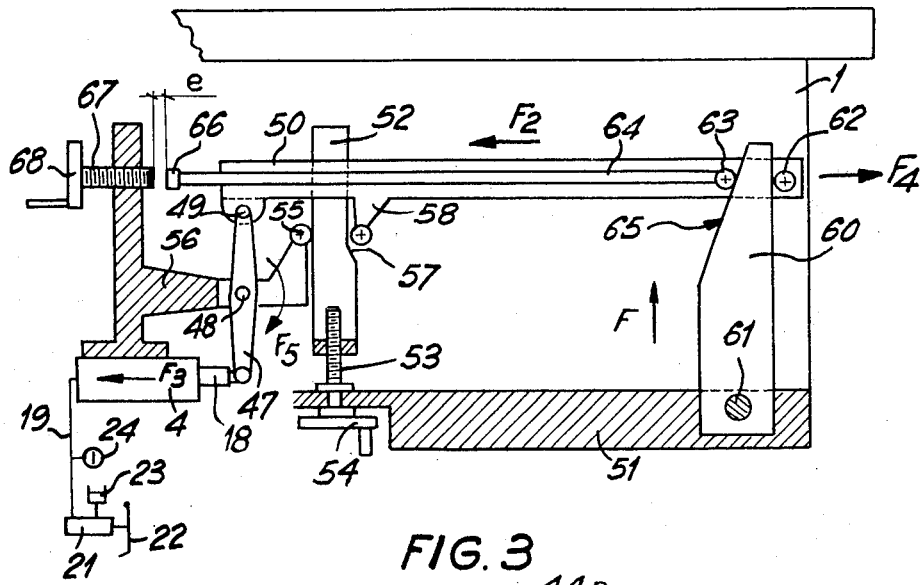
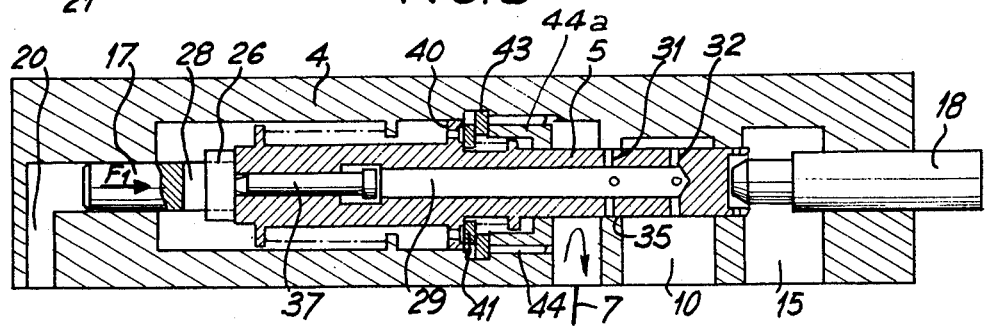

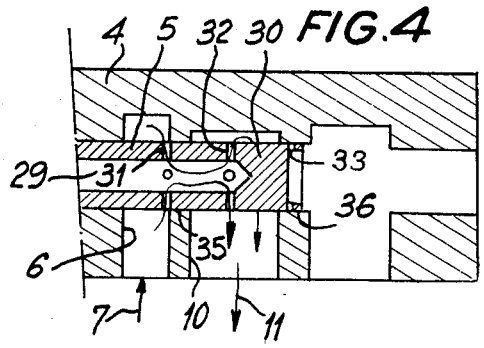
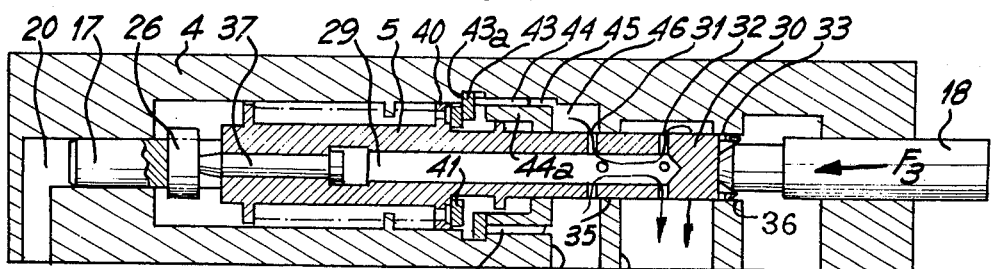
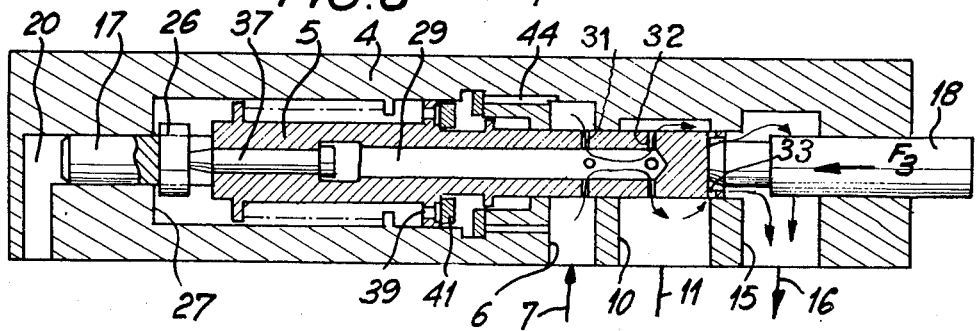
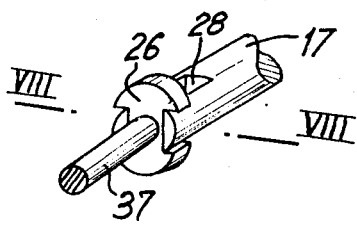
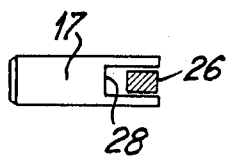

DEVICE FOR CONTROLLING A MOVABLE MEMBER ON A MACHINE TOOL

The present invention relates to devices intended for certain machine tools for controlling the movements of a movable member thereof, for example the bending apron of a hydraulic folding machine or the table of a hydraulic shear.

Hitherto known machines of this character comprise as a rule hydraulic control means of particularly complicated design for performing different functions. In fact, the movable table or apron of these machines must be driven successively at two different speeds, namely a fast approach speed and a slow working speed. On the other hand, at the end of its stroke this movable member must be stopped automatically in an adjustable position.

Up to now, these problems have been solved by resorting to two types of solutions. The first type consists in providing a single control pump in the hydraulic circuit and to cause its constant output to flow either through the cylinder of a cylinder-and-piston actuator or through a group of cylinders of relatively small cross-sectional area, thus producing a high or so-called 'approach' speed, or through a group of cylinders of which the total cross-sectional area is considerably larger in order to provide a slower speed called 'working speed'.

The second solution consists in utilising a single group of cylinders supplied with hydraulic fluid from a pair of pumps, namely a high-output, low-pressure pump called 'approach pump', and a low-output, high-pressure pump called 'working pump'.

In either case, the control system comprises a device adapted to operate the movable member at low speed when the apron or table thus controlled has attained its working position. As a rule, this device comprises a valve capable of bringing the necessary modification to the circuit as a consequence of the increment in fluid pressure which occurs in said circuit when the movable apron or table becomes operative for performing a working operation.

The device for automatically stopping the movable apron at the end of its stroke may consist of a so-called 'hydraulic abutment member' adapted to stop the operation of the driving cylinders while holding the fluid pressure as long as the operator does not control the return stroke of the movable apron or like member.

Therefore, most of the hitherto known control systems of this type comprise various devices or apparatus each capable of performing, or entrusted with, a well-defined function or operation. As a result, these control systems are relatively complicated and expensive. Furthermore, they are cumbersome and in case of failure several disassembling and checking operations are necessary.

It is therefore the essential object of this invention to provide a control system of considerably simpler conception yet capable of performing the same functions as the hitherto and presently used apparatus of this kind. Moreover, the device according to this invention is characterized by a number of important improvements and features.

This system comprises a single distributor incorporating a slide valve adapted to be actuated either by the operator or by a mechanical servo device responsive to one or a plurality of separate control members associated with the movable member to be driven and so arranged that the successive actions of these control members are attained by different movements of said slide valve, the complementary communication passages formed in this valve and in the distributor body being so arranged that the actuation of said slide valve by the operator imparts the desired progressiveness to the fast movement and that the other successive actuations of said slide valve by the servo device ensure a speed change and the stoppage of the movable member to be driven at the end of the stroke, respectively.

In a specific form of embodiment of this invention the slide valve is actuated by means of a pair of push members; one of these push members is controlled by the operator and the other push member is operatively connected to a mechanical control device responsive to the movement of the controlled member.

According to another feature characterizing this invention, the distributor comprises internal hydraulic means capable likewise to move said slide valve to its slow-motion position as a consequense of a fluid-pressure increment in the circuit, this increment taking place when the movable member of the corresponding machine tool becomes operative.

Thus, the single distributor of this control system provides by itself the functions usually devolved to a plurality of separate apparatus. This is attained of course by a greater simplification in the construction and operation of the system. However, this control system is also characterized by a number of additional improvements which will become apparent as the following description proceeds with reference to the attached drawings illustrating diagrammatically by way of example a typical form of embodiment of the invention. In the drawings:

FIG. 1 is a diagrammatic axial longitudinal section of the single distributor of the control system according to this invention, this distributor being shown in its inoperative position;

FIG. 2 is a part-elevational, part-sectional view of the mechanical control device associated with this distributor;

FIG. 3 is a view similar to FIG. 1, illustrating the distributor in its position corresponding to the high-speed driving of the movable member to be controlled;

FIG. 4 is a part-sectional view showing the present distributor in a different position providing an intermediate speed;

FIG. 5 is a view similar to FIG. 1, showing the distributor in its position corresponding to the low-speed driving of the movable member;

FIG. 6 is a view similar to FIG. 5 showing the distributor in its inoperative position at the end of a stroke;

FIG. 7 is a fragmentary perspective view of a detail;

FIG. 8 is a section taken along line VIII—VIII of FIG. 7;

Figure 9:
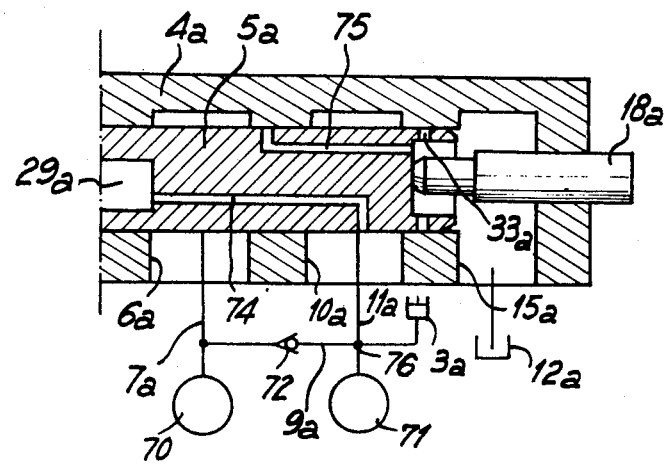
FIGS. 9 and 10 are fragmentary sectional views showing a modified form of embodiment of the distributor of FIG. 1, which is adapted for operating a single group of cylinder-and-piston actuators supplied with fluid under pressure from two separate pumps, this distributor being shown in FIG. 9 in the 'approach' position and in FIG. 10 in the operative position.

In the exemplary form of embodiment illustrated in the drawings the control system of this invention is intended for driving and controlling the movable apron or table 1 of a machine tool such as a bending press or a shear. In the example illustrated in FIGS. 1 to 8 inclusive, the apron is driven by means of two separate groups of cylinder-and-piston actuators, i.e.: a cylinder 2 adapted to drive the apron 1 at a relatively high speed for approach purposes and one or a plurality of cylinders 3 for driving the apron 1 at a relatively low speed for performing the work contemplated, in this case, the bending of a metal sheet.

To this end, the cylinders of these two groups have different characteristics, notably different cross sections.

As already explained in the foregoing, this system comprises a single distributor designated in general by the reference numeral 4. This distributor encloses a slide valve 5 and its body comprises three lateral apertures communicating with the outside, namely:

a first aperture 6 connected via a pipe line 7 to a pump 8 of the hydraulic circuit, the cylinder 2 being supplied with fluid through a branch line 9 of said pipe line 7;

a second aperture 10 connected through a branch line 11 to the operating cylinder of cylinders 3 connected on the other hand to the fluid reservoir 12 via another pipe line 13 in which a non-return valve 14 is inserted, and finally, a third lateral aperture 15 connected via a pipe line 16 to the reservoir 12.

Registering with the ends of slide valve 5 are two control push-rods or like members 17 and 18, respectively. The first push-rod 17 constitutes the main control member of the slide valves and is adapted to be actuated by the operator of the machine. The other push member 18 is the accessory control member adapted to actuate the slide valve 5 for modifying certain control movements of the distributor as a function of predetermined external conditions.

The main control push member 17 consists of a piston responsive to the fluid pressure built up in a hydraulic control line or conduit 19 connected to a chamber 20 disposed behind this piston. This control line 19 may be dependent or not of the main hdyraulic circuit of the machine. By way of example, it may comprise a hydraulic master cylinder 21 similar to the master cylinders of hydraulic-controlled braking systems of motor vehicles, and is adapted to be operated by means of a pedal 22 controlled by the operator of the machine. This master cylinder 21 communicates with an expansion vessel 23. On the other hand, a hydraulic accumulator 24 is branched off the pipe line 19.

Thus, by depressing the pedal 22 the operator can move the control piston or push rod 17 in the direction of the arrow $F_1$ to force the slide valve 5 in this direction. However, it may be emphasized that the present hydraulic control system may be replaced by a mechanical or electro-mechanical control device adapted to drive the push-rod 17.

A return spring 25 constantly urges the slide valve 5 to its inoperative position in which it engages a movable abutment member 26 bearing in turn against the registering end 27 of the chamber of distributor 4. This movable abutment is slidably mounted in a fork 28 formed in the relevant end of control piston 17. As illustrated in FIG. 7, this abutment member has a substantially H-shaped configuration with the intermediate cross-bar thereof engaging said fork 28 so that this member can slide along the relevant end of piston 17.

The slide valve 5 comprises an axial bore 29 extending along the greater part of its length without emerging however from the end 30 thereof adjacent the accessory control push-rod 18. Now this slide valve comprises two sets of radial orifices 31 and 32 opening into said bore 29. The end 30 of bore 29 comprises another set of radial orifices 33 opening into a cavity 34 formed in this end 30. These sets of orifices play an essential role in the operation of the system, in combination with orifices 6, 10 and 15 formed in the distributor body and a pair of inner necks 35 and 36 formed in said body.

At its end adjacent the movable abutment member 26 the bore 29 of slide valve 5 encloses a small piston 37 adapted to move this abutment member 26 as will be explained presently.

On the other hand, the slide valve 5 is provided with a dash pot designated in general by the reference numeral 38 and adapted to impart the necessary stability of operation to the system. This dash pot comprises a series of orifices 39 formed in a flange 40 of slide valve 5 and adapted to be closed by an annular valve member 41 urged by a spring 42.

The body of this distributor also encloses an annular push member 43 registering with said valve member 41 and adapted to engage the latter for moving the flange 40 of slide valve 5 under certain predetermined conditions with the assistance of four small pistons 44. These small pistons 44 disposed at a 90° relative spacing are slidably mounted in small bores 45 formed in the thickness of a shoulder 44a of the distributor body, the ends of these bores which are opposite to said annular push member 43 opening into an annular chamber 46 formed at the level of the lateral port or orifice 6.

As will be explained presently, the pistons 44 and push member 43 are adapted to control the change of driving speed of movable apron 1 when a pressure increment occurs in the circuit as this apron begins to operate. This system is thus adapted to play the same role as the valve usually provided in hitherto known hydraulic systems controlling machines of this character.

As already mentioned hereinabove, the push member 18 constitutes an auxillary control member adapted to modify at least some of the control actions performed by the distributor under well-defined external conditions. To this end, the push member 18 is responsive to the mechanical device illustrated in FIG. 2. This device comprises a control lever 47 fulcrumed to a fixed pivot pin 48 and having one end adapted to engage said push-rod 18 and the other end pivoted at 49 to a control rod 50. This control rod 50 is controlled in turn independently by a pair of members carried by the movable apron 1 or more exactly by a cross member 51 rigid with said apron, for actuating the distributor slide valve 18 when the apron speed must be modified and when the apron has completed its stroke, respectively.

The first control member comprises a movable bar 52 connected to said cross member 51 by means of a screw 53 rigid with a crank 54 to reconstitute a device for adjusting the position of said bar 52. During the movement of apron 1, one of the longitudinal edges of this bar 52 moves in sliding contact with a guide roller 55 mounted on a fixed support 56. The opposite edge of said bar 52 comprises a cam face 57 adapted to engage a projection 58 carried by control rod 50 and advantageously provided with a roller 59.

The second member controlling the rod 50 consists of an arm 60 having one end pivoted at 61 to said cross member 51 carried by the movable apron 1. The opposite end of this arm is movable between a pair of rollers 62 and 63 carried by the corresponding end of control rod 50 and by another rod 64 slidably mounted in said control rod 50 which is hollow, respectively. Now the edge of arm 60 engaging said roller 63 comprises a cam face 65 adapted to push this roller in the direction $F_2$ during the movement of this arm 60 in conjunction with the apron 1 in the direction of the arrow F.

However, the opposite end 66 of rod 64 registers with a stop member 67 consisting of a screw engaging a fixed bracket 56, the head of said screw carrying a control crank 68 to constitute an adjustment device. In this respect it is worth pointing out that a play $e$ was provided initially between the rod 64 and stop 67. Thus, as a consequence of the movement impressed by said cam 65, this rod 64 can move to the left (as shown by the arrow $F_2$ in FIG. 2) until it engages the screw 67.

However, the mode of operation of the present mechanical control device will be described in detail presently, in conjunction with the mode of operation of the distributor proper.

In the inoperative condition, the slide valve 5 of distributor 4 is in the position shown in FIG. 1. Thus, the output of pump 8 is directed to the reservoir 12 via the successive sets of radial orifices 31 and 32 of said slide valve and the outlet port 15 of the distributor.

When the operator depresses the control pedal 22 home, the piston 17 moves the slide valve 5 in the direction of the arrow $F_1$ to the position shown in FIG. 3 so that the slide valve flange 43 abuts against the inner shoulder 44a and flange 40. In this position, the orifices 31 are located beyond the lateral orifice 6 of distributor 4 and register with the inner flange 35 thereof. Therefore, since the pump output circulating in pipe line 7 cannot flow through the distributor, it will supply the 'approach' cylinder 2 for moving the apron 1 at high speed. Besides, the complete pump output is directed to this cylinder 2 and thus the apron is drived at its maximum speed.

Of course, the working cylinder or cylinders 3 are caused to follow the movement of apron 1. However, their chamber or chambers may be filled with hydraulic fluid taken directly by suction from the reservoir 12 via pipe line 13.

In any case, the operator can adjust at will the approach speed of apron 1. To this end, it is only necessary to depress the control pedal 22 partially instead of completely. Thus, the operator may actuate the piston 17 so that the latter will bring the slide valve 5 to the intermediate position shown in FIG. 4, in which the orifices 31 of slide valve 5 are kept at least partially in such position that they register with the inlet orifices 6. Under these conditions, one fraction of the output of pump 8 is diverted towards pipe line 11 and the working cylinder or cylinders 3, thus reducing the approach speed. Thus, this approach speed is adjustable as a function of the cross-sectional passage area resulting from the partial closing of orifices 31, due to the more or less complete engagement of the valve 5 into the inner flange 35 of the distributor body.

The accessory control member 52 of the mechanical device illustrated in FIG. 2 is so adjusted that its cam 57 actuates the projection 58 carried by control rod 50 when the movable apron 1 reaches the position preceding the position in which the corresponding machine tool actually begins its bending, shearing or other operation.

When, during its stroke, the movable apron 1 clears the thus selected position, the cam 57 engages the roller 59 of projection 58 on rod 50 and moves this rod 50 back in the direction of the arrow $F_4$. This movement is attented by a clockwise pivotal movement of lever 47 (see arrow $F_5$) and therefore by a movement of translation of push member 18 in the direction of the arrow $F_3$. Thus, the slide valve 5 is moved back to the position illustrated in FIG. 5, in which its orifices 31 register with the inlet port or orifice 6 of the distributor body. The pump output is thus divided among the cylinder 2 and working cylinders 3 to which it is delivered via the outlet port or orifice 10. The speed of the movable apron 1 is thus reduced to its normal working rate to avoid the inconveniences arising from an excessive speed of this movable member when it begins to perform its working phase.

By virtue of the provision of the simple adjustment device comprising the screw 53 and crank 54, the operator can select at will the position in which the apron 1 will change its rate of feed before beginning its actual operation.

However, this system also comprises means for causing this speed change to take place as a consequence of an increment in the fluid pressure which may occur in case the position of cam 57 on bar 52 had not been properly set.

This second control means consists of the above-mentioned set of small pistons 44 and the push member 43 actuated thereby. In fact, when an increment in the fluid pressure takes place within the distributor as a consequence of the setting in operation of the movable apron 1, attended by the application of a clamping force to the metal sheet held in the tools, said small pistons 44 are moved to the left, in the direction of the arrow $F_3$ (FIG. 2) Thus, these small pistons 44 move by means of the annular push member 43 the slide valve 5 back in the same direction, said push member 43 engaging the valve member 41 during this movement. Therefore the slide valve 5 is moved in the direction of the arrow $F_3$ until the annular push member 43 abuts a fixed shoulder 43a of the inner wall of the distributor. Now, this sets the slide valve 5 in the same position as that obtained in the preceding case by means of push member 18.

The action exerted by the set of small pistons 44 of annular push member 43 on the flange of slide valve 5 is illustrated in the upper half of FIG. 5, in which the corresponding piston is shown in its operative position while in the lower half of this Figure the corresponding piston is shown in its inoperative position. This arrangement is thus capable of moving the slide valve 5 to the position illustrated in FIG. 5 in case this had not been obtained through the push member 18. Therefore, the velocity of the apron or like member of the machine is changed as in the preceding case.

At this time, the possibility of stopping the apron during a short time period may be contemplated, for example to enable the operator of the machine to properly dispose and clamp the workpiece on the apron. To this end, there is simply provided as an auxiliary device a solenoid valve 78 responsive to a switch controlled by the cam 57. This solenoid valve branched off the pipe line 11 connects the outlet orifice 10 to the reservoir 12 via a branch line 79 when the switch is actuated, thus stopping the apron while maintaining the fluid pressure in the 'approach' cylinder 2. Then, it is only necessary for the operator to depress a manual switch for de-energizing the solenoid valve 78 and permit the restarting of the apron 1 at low speed under the predetermined conditions.

The apron 1 will then continue its movement at low speed for performing the normal working operation of the machine, i.e. in the case contemplated more particularly herein by way of example, the bending of a metal sheet. Of course, the operator can adjust this low 'working speed' at will by more or less depressing the control pedal, as in the case of the approach speed.

However, the cam 65 carried by arm 60 is adapted to stop the movable apron at the end of its stroke. This limit position is adjustable by means of the abutment screw 67 for setting the play $e$.

As the movement of apron 1 continues, said cam 65 moves the rod 64 to the left, as shown by the arrow $F_2$. However, at the beginning, nothing happens, but when the end 66 of this rod 64 engages the screw 67 the roller 63 is stopped, whereby, as the movable apron 1 continues its stroke, the end of arm 60 acts as a wedge and moves the roller 62 in the direction of the arrow $F_4$, thus moving the hollow control rod 50 in this direction. As a consequence, the lever 47 is pivoted clockwise (arrow $F_5$) and the push member 18 is sunk more deeply into the distributor body. Finally, the slide valve is thus brought to the position illustrated in FIG. 6.

In this position, the orifices 33 at the end 30 of slide valve 5 register at least partially with the orifice 10 of distributor body 4 while the orifices 31 still register with the inlet orifice 6 thereof and orifices 32 are on the other hand aligned with said orifice 10. Now the orifices 33 permit via the end cavity 34 the communication between the outlet orifice 15 of the distributor with the orifice 10 thereof and also with the slide valve orifices 32. Consequently, a state of equilibrium is obtained whereby the apron 1 is stopped while maintaining the fluid pressure in the driving cylinders.

The pump output is returned to the reservoir 12 via orifices 33, with a loss of pressure corresponding to the operating pressure.

It may be emphasized that the dash pot 38 is effective for imparting the necessary stability to the slide valve 5, and also that when the fluid pressure has increased in the cavity 29 of slide valve 5, piston 37 is moved to the left, as shown by the arrow $F_3$ (FIG. 2). This movement of piston 37 causes the movable abutment member 26 to recede to the bottom of strap 28 at the corresponding end of piston 17.

Now the hydraulic system comprising the piston 37 and movable abutment member 26 is subsequently capable of acting as a means for retarding the movement of slide valve 5 during the backward movement of the main control push-rod 17 in order to avoid huntings. In fact, releasing the control pedal 22 at the end of the working phase of the machine operation causes the piston 17 and abutment member 26 to move backwards so that the latter engages the corresponding end 27 of the chamber of distributor 4 while the piston 17 continues its backward movement alone to the position shown in FIG. 1.

During this movement the end of piston 37 remains in contact with the movable abutment member 26 and reacts thereagainst. Now, since the head of piston 37 is responsive to the working pressure prevailing in the inner cavity 29 of slide valve 5, the backward movement of this slide valve is somewhat retarded, whereby a slow decompression is produced in the hydraulic circuit, without any hunting. The slide valve 5 is thus allowed to recede slowly to its inoperative position illustrated in FIG. 1, so that the pump-to-cylinder circuit is connected to the reservoir and the movable apron 1 is returned to its inoperative position.

With the above-described system incorporating a single distributor it is possible to perform the various necessary operations. Now the essential feature characterizing this system is that it is considerably simpler than those usually provided on machine tools for performing similar control actions.

Moreover, this system is considerably more economical and less cumbersome than hitherto known arrangements designed for the same purposes. Besides, any repairs are greatly facilitated since only one operation is required for removing the single distributor of the present control system and replacing same with another distributor.

However, this system should not be construed as being strictly limited by the single form of embodiment described hereinabove and illustrated in the attached drawings, since various modifications and changes may be brought thereto without departing from the basic principles of the invention as set forth in the appended claims.

Figure 10:
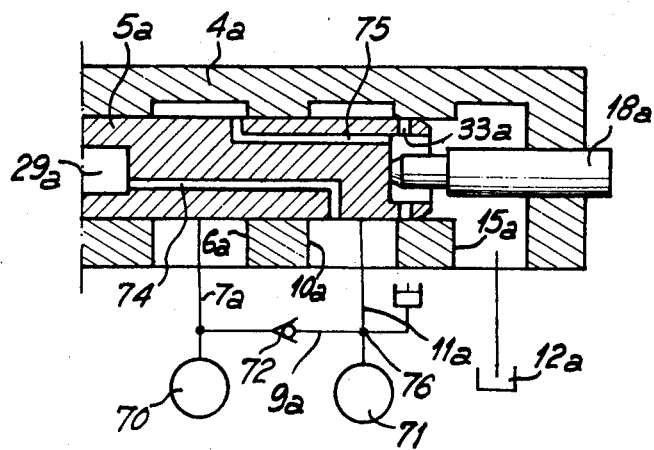

Thus, the distributor illustrated in FIGS. 9 and 10 of the drawings is a modified embodiment of the above-described structure wherein the rate of travel of the movable controlled member is modified with the assistance of a pair of pumps and a single group of hydraulic cylinder-and-piston actuators. In fact, in this case the movable apron 1 is driven by a single group of cylinders $3a$ adapted to be supplied with hydraulic fluid either from a high-output, low-pressure 'approach' pump 70, or from a low-output, high-pressure 'working' pump 71. The first pump 70 is connected both to the pipe line $7a$ leading to the lateral orifice $9a$ of the corresponding distributor and to a branch pipe line $9a$ in which a non-return valve 72 is inserted. The 'working' pump 71 is connected not only to a pipe line $11a$, leading to the external port $10a$ of said distributor, but also to the set of cylinders $3a$ via a connecting union 76 inserted in said branch line $9a$. The operation of this modified arrangement is the same as that of the above-described example and to this end the fluid passages formed in the corresponding slide valve $5a$ are replaced by a pair of ducts 74 and 75 of which the arrangement is such that the set of cylinders $3a$ can communicate either with the 'approach' pump 70 or with the 'working' pump 71.

In the inoperative condition the two pumps 70, 71 deliver fluid under pressure to the reservoir. In the 'approach' position (FIG. 9) the 'approach' pump 70 forces fluid into cylinder $3a$ via branch line $9a$, since none of ducts 74 or 75 is accessible. In the operative position (FIG. 10) the pump 71 alone delivers fluid under pressure to cylinder $3a$ via connecting union 76 and supplies the chamber $29a$ of slide valve $5a$ via duct 74, while the first pump 70 remains connected to the reservoir $12a$ through duct 75.

On the other hand, all the other features and functions of this distributor are the same as those disclosed hereinabove in connection with the first example.

With both forms of embodiment of the distributor it would be possible to dispense with the hydraulic system causing a partial return movement of slide valve 5 or $5a$ as a consequence of an increment in the internal fluid pressure when the movable apron 1 begins to operate. In this case, the speed of the apron 1 would be modified only through the action of cam 57 incorporated in the mechanical device illustrated in FIG. 2.

Moreover, as already explained in the foregoing, the hydraulic control circuit associated with the main push member 17 could be replaced by any other suitable control device, provided that it comprises a buffer member or spring means permitting the backward movement of the piston during the movement of piston 18 or of the small pistons 44 for producing the same action as that of the above-described hydraulic accumulator 24.

Finally, instead of being actuated by two push members or rods registering with its ends, the slide valve may be embodied in the form of a same and single member controllable by the operator of the machine, and also by the mechanical device of FIG. 2 providing the necessary auxiliary control actions.

If desired, the control system of this invention may be used for controlling not only bending presses and shears but also various other types of machine tools in which the movements of a movable working member are to be controlled under similar conditions.

What is claimed as new is:

1. In a machine tool comprising a driven member for performing an operation such as bending or shearing a sheet-metal workpiece, a hydraulic control system for controlling the movements of said driven member, at different speeds including at least one relatively fast speed for approach and one relatively low speed for working, and also for automatically stopping said member in an adjustable position at the end of its stroke, said hydraulic control system comprising a single distributor a slide valve provided in said distributor, actuating means associated with said slide valve and adapted to be operated by the operator, a mechanical device adapted to actuate also said slide valve, a plurality of successive control members associated with said movable member to be driven, and adapted to actuate said mechanical device in order to produce different movements of said slide valve, and complementary passages provided in said distributor body and in said slide valve and being so arranged that the actuation of actuating means by the operator imparts the desired progressiveness to the fast motion of said driven member, the other successive actions exerted on said slide valve by said mechanical device controlling at least the change of speed and the stoppage of said driven member at the end of its stroke.

2. Hydraulic system as set forth in claim 1, wherein said actuating means adapted to be operated by the operator consists of a push member facing one of the extremities of said slide valve, and mechanical device adapted to actuate also said slide valve consists of another push member facing the opposite extremity of said slide valve driven member at the end of its stroke.

3. Hydraulic system as set forth in claim 2, wherein said distributor comprises internal hydraulic means adapted to control the slide valve movement in the low-speed position when an increment in the fluid pressure in the hydraulic circuit takes place and said driven member of the machine begins to operate.

4. In a machine tool comprising a driven member for performing an operation such as bending or shearing a sheet metal workpiece, a hydraulic control system for controlling the movements of said driven member, for example the movable apron of a bending press, which comprises a driving device adapted to impart two rates of feed to said driven member, namely a high-speed, low-torque motion and a low-speed, high torque motion, and circuit means for supplying fluid under pressure to said device, said circuit means comprising one or a plurality of delivery pumps and a return reservoir, said system further comprising a single distributor incorporating a slide valve, means for enabling the operator of the machine to actuate said slide valve manually, a mechanical device responsive to one or a plurality of separate control members associated with said movable apron and so arranged that the successive actions of said separate control members can produce different movements of said slide valve, and additional communication passages formed in said slide valve and so arranged that manually actuating said slide valve under the operator's control will cause the movements of said movable apron to take place with the desired progressiveness, and that the other successive actuations of said slide valve by said mechanical device control the change of speed and the stoppage of said movable apron at the end of its stroke.

5. Hydraulic control system as set forth in claim 4, wherein said distributor incorporates hydraulic control means adapted to move its slide valve to the position ensuring the low-speed feed of said driven movable apron in lieu of the fast-speed thereof, and means adapted to cause said hydraulic system to become operative when the fluid pressure increases in the working circuit as a consequence of the operation of said movable apron controlled by said system.

6. Hydraulic system as set forth in claim 5, wherein said means controlling the distributor slide valve comprises a plurality of small pistons slidably mounted in an inner shoulder of said distributor body, and annular push member engageable by said small pistons for actuating a flange formed integrally with said slide valve, said small pistons being responsive to the pressure prevailing in said distributor body.

7. Hydraulic system as set forth in claim 6, wherein said mechanical device controlling the distributor slide valve comprises one or a plurality of arms carried by the movable apron to be driven and each provided with a cam adapted to actuate a control rod coupled directly or indirectly to said slide valve through the medium of a pivoting lever, separate adjustment means for determining the position of said movable apron in which one or the other of said cams is to actuate the control rod, one cam for changing the speed before said movable apron begins its movement and the other cam for stopping said movable apron at the end of its stroke.

8. Hydraulic system as set forth in claim 7, wherein said distributor further incorporates means for hydraulically retarding the movement of said slide valve during the backward movement of the main control push-rod.

9. Hydraulic system as set forth in claim 8, wherein said means for hydraulically retarding the movement of said slide valve during the backward movement thereof comprises an axial bore formed in said slide valve, a piston slidably mounted in said bore and a rod rigid with said piston and adapted to engage and react against a movable abutment member carried by the corresponding end of said main push-rod, said abutment member being also adapted to engage the corresponding end of the distributor chamber.

10. Hydraulic system as set forth in claim 9, wherein said circuit comprises a solenoid valve adapted to stop said hydraulic driving device when a speed change takes place, said solenoid valve being responsive to a switch coupled to the change-speed control member, another switch adapted to be actuated manually by the operator of the machine being provided for de-energizing said solenoid valve and thus enable the movable apron to resume its low-speed motion.

11. Hydraulic system as set forth in claim 10, wherein said driving device comprises a single pump adapted to deliver fluid under pressure to two separate groups of cylinder and piston actuators, one group for controlling the high-speed, low-torque operation and the other group for controlling the low-speed, high-torque operation, the distributor body comprising in this case three orifices, namely a first orifice for connecting the supply line from said single pump, this supply line having a branch line leading to the actuator controlling the high-speed motion, a second orifice communicating with another pipe line leading to the low-speed actuator, and a third orifice connected to a discharge line leading to the reservoir, the passage means formed in said slide valve being adapted to co-act with a pair of internal flanges of said distributor which are disposed between said three orifices.

12. Hydraulic system as set forth in claim 10, wherein a driving device comprising a single group of cylinder-and-piston actuators adapted to be supplied with hydraulic fluid under pressure from a pair of pumps is provided, one pump being intended for the high-speed movement and the other for the low-speed movement, said distributor body comprising three orifices corresponding the first one to the branching off of a pipe line leading from said high-speed pump, with another pipe line branched off this line and leading to the low-speed pump and to the working actuator via a non-return valve, said second orifice receiving the pipe line from said low-speed pump and said working actuator, said third orifice being connected to the fluid reservoir.

* * * * *